(12) United States Patent
Campbell et al.

(10) Patent No.: US 8,071,149 B2
(45) Date of Patent: Dec. 6, 2011

(54) EASY OPEN DOUGH DISTRIBUTION MANIFOLD

(75) Inventors: Bruce V. Campbell, Richmond, VA (US); Remberto Pedraja, Glen Allen, VA (US)

(73) Assignee: AMF Automation Technologies, Inc., Richmond, VA (US)

( * ) Notice: Subject to any disclaimer, the term of this patent is extended or adjusted under 35 U.S.C. 154(b) by 790 days.

(21) Appl. No.: 12/187,600

(22) Filed: Aug. 7, 2008

(65) Prior Publication Data
US 2010/0034915 A1  Feb. 11, 2010

(51) Int. Cl.
*A21D 6/00* (2006.01)
*A21C 11/16* (2006.01)

(52) U.S. Cl. .............................. 426/503; 425/311; 99/537

(58) Field of Classification Search ................. 99/537; 425/96, 113, 227, 238–241, 133.5, 208, 311, 425/308, 382 R, 464; 426/503, 518; 137/883, 137/884
See application file for complete search history.

(56) References Cited

U.S. PATENT DOCUMENTS

| | | | |
|---|---|---|---|
| 3,609,808 A | 10/1971 | Jacobi et al. | |
| 3,887,322 A * | 6/1975 | Johnson et al. | 425/466 |
| 4,015,926 A * | 4/1977 | Nehmey | 425/464 |
| 4,076,477 A * | 2/1978 | Hacke | 425/192 R |
| 5,350,290 A | 9/1994 | Honings | |
| 5,356,652 A | 10/1994 | Campbell | |
| 5,643,618 A | 7/1997 | Huberg et al. | |
| 6,303,168 B1 * | 10/2001 | Campbell | 426/496 |
| 6,397,888 B1 * | 6/2002 | Wang | 137/624.12 |
| 6,579,555 B1 * | 6/2003 | Weinstein et al. | 426/571 |
| 6,626,660 B1 * | 9/2003 | Olson et al. | 425/190 |
| 2002/0098255 A1 * | 7/2002 | Ayash | 425/208 |
| 2008/0099953 A1 * | 5/2008 | Fork et al. | 264/176.1 |
| 2008/0160127 A1 * | 7/2008 | Davis et al. | 425/239 |
| 2009/0142441 A1 * | 6/2009 | Pedraja | 425/565 |
| 2010/0180779 A1 * | 7/2010 | Oki et al. | 99/537 |
| 2010/0206184 A1 * | 8/2010 | Oki et al. | 99/538 |
| 2010/0221375 A1 * | 9/2010 | Fork et al. | 425/113 |

* cited by examiner

*Primary Examiner* — Mark Graham
(74) *Attorney, Agent, or Firm* — Thomas, Kayden, Horstemeyer & Risley, LLP

(57) ABSTRACT

The dough distribution manifold (10) includes a housing (12) with a perimeter wall (14) forming a dough distribution chamber (20). Removable bottom wall (16) and removable top wall (18) are positioned on the perimeter wall. Top wall (18) includes a cover plate (40) and an insert plate (42), with the insert plate having a protrusion (44) that extends into the dough distribution chamber (20), whereby different sized insert plates may be combined with the cover plate to adjust the height of the dough distribution chamber. The perimeter wall (14) is independently supported with respect to said bottom wall (16) and top wall (18) so that the bottom and top walls may be removed while leaving the perimeter wall in place for inspection and cleaning. Valves (56) and dough dividers (34 and 64) are used to direct the movement of dough in equal amounts through the delivery openings (32).

17 Claims, 3 Drawing Sheets

EASY OPEN DOUGH DISTRIBUTION MANIFOLD

FIELD OF THE INVENTION

This invention concerns a dough handling apparatus for forming dough into separate parallel dough streams for cutting pieces of dough from the separate dough streams. More particularly, the invention concerns a dough distribution manifold that divides an oncoming dough stream into several dough streams for parallel processing.

BACKGROUND OF THE INVENTION

In the processing of baker's dough, dough is usually made up by feeding raw dough and a liquid into a pressure pump, and the pump advances the dough through various stages toward an oven. For example, the dough from the pressure pump might pass through a developer that stretches the gluten of the dough, and then through a metering pump where the pressure of the dough is increased and stabilized. The dough passes from the metering pump through a scaling distribution manifold that divides the oncoming dough into several dough streams. The dough streams then pass through a cut-off device that cuts the oncoming dough streams into smaller pieces, the pieces being suitable for baking as biscuits, buns, hot dog buns, etc. Examples of some of these components are disclosed in U.S. Pat. Nos. 5,270,070, 5,283,074, 5,356,652, 4,008,025, 4,306,850, 4,332,538, 4,449,908, and 4,948,611. Prior art dough distribution manifolds are disclosed in U.S. Pat. Nos. 5,350,290, 5,356,652 and 6,303,168.

One of the major requirements in operating dough handling equipment is that the equipment be maintained in a clean and sanitary condition. Typically, this means that the operation of the equipment must be terminated and the residual dough removed from the interior surfaces of the equipment. The various mixers, developers, valves, distribution manifolds, and cut-off devices have internal surfaces that contact the dough. The various equipment pieces must be opened so that their internal surfaces that were contacted by the dough are exposed and accessible for a cleanup procedure. For example, the cleanup procedure may be at the end of a day's work, when the type of dough being processed is changed, or when pathogens are likely to be developed in the equipment, etc.

With regard to dough distribution manifolds, the dough is moved into a chamber where it typically is engaged by divider blades that guide separate dough streams to a plurality of outlet ports, changing the entrance stream into a plurality of outlet streams that proceed in parallel to a cut-off device for cutting the streams into dough segments that are rounded and baked into buns, etc.

Typically, a dough distribution manifold is difficult to properly inspect, maintain and clean. The usual presence of the dough divider blades, multiple small channels through which the dough moves, and devices attached to the walls of the housing, such as valves and bolts or other connecting devices for holding the assembly of parts together, are tedious to disassemble and reassemble. In some of the prior art distribution manifolds, the dough divider blades are made so that they are movable to adjust the volume of dough passing to an outlet, and knobs or other devices for adjusting the internal divider blades extend through the walls of the distribution manifold. It is time consuming and difficult to remove the parts for inspection and cleaning and later reassemble the components and adjust them for continued operation. There may be crevices in which the remaining dough can reside after a run has been completed, and it is difficult for the maintenance personnel to reach the different crevices, angles and obstructions within the distribution manifold.

It is to these and other problems and improvements that this invention is directed.

SUMMARY OF THE INVENTION

Briefly described, the present invention comprises a dough distribution manifold for a dough processing assembly that includes component parts that continuously divide an oncoming stream of dough into separate discharge streams that are eventually cut into dough balls for further processing for movement into an oven for baking the dough into buns, etc.

The dough distribution manifold includes a housing with a bottom wall, a perimeter wall for forming a dough distribution chamber with the bottom wall and a removable top wall positioned on the perimeter wall for closing the dough distribution chamber. The perimeter wall includes an entrance wall segment positioned on one side of the dough distribution chamber and an exit wall segment opposed to said entrance wall segment on the other side of said dough distribution chamber. The entrance wall segment defines a dough entrance opening for passing an incoming dough stream into the dough distribution chamber, and the exit wall segment defines a plurality of dough delivery openings for delivering a plurality of dough streams from the distribution chamber to subsequent stages of the overall process. The dough distribution manifold may include dough dividers positioned between adjacent ones of the dough delivery openings, with an edge of each dough divider directed toward the dough entrance opening of the manifold. The dough dividers are arranged for separating the dough passed through the dough distribution chamber into separate dough streams that enter the dough delivery openings. In one embodiment the dough dividers are movable so that their positions may be adjusted to direct more or less dough to adjacent ones of the dough streams.

The top wall of the dough distribution manifold is releasably mounted to the perimeter wall by means of hand operated connectors. When the top wall is opened away from the rest of the dough distribution manifold, the inside surfaces of the dough distribution manifold that are contacted by the dough are exposed for inspection, maintenance, and cleaning.

A pressure gauge may be mounted to the top wall of the dough distribution manifold so that when the top wall is removed from the rest of the dough distribution manifold, the pressure gauge and the top wall can be moved to a remote location for inspection, cleaning, etc. To facilitate this, the top wall includes lifting handles that straddle the pressure gauge for conveniently allowing the operator to lift the top wall away from the perimeter wall, and to conveniently and expediently replace the top wall back on the perimeter wall when the inspection, cleaning, etc. has been completed.

In order to regulate the volume of dough delivered through each dough delivery opening, valves may be positioned down stream of the dough delivery openings that can be used by an operator to mechanically adjust the rate at which the dough is delivered through each dough delivery opening.

Preferably, the dough distribution manifold is wedge-shaped, with side wall segments diverging from an entrance wall segment outwardly to a larger exit wall segment.

Another feature of the dough distribution manifold may be that the top wall of the dough distribution manifold includes a cover plate that spans the perimeter wall and is arranged in sealed relationship with the perimeter wall. An insert plate may extend from the cover plate downwardly into the dough distribution chamber, with the insert plate having an edge portion matching the shape of the perimeter wall. With this feature, the height of the distribution chamber may be varied by exchanging top walls having different depths of the insert plates. This provides the correct profile and volume inside the chamber so that an accurate dough path is provided for maximum scaling accuracy of the dough. Also, the insert plate of the removable top wall, the facing surface of the bottom wall, and the interior surfaces of the perimeter wall may be made of low friction material, such as polypropylene so as to minimize the friction between the dough and the interior surfaces of the dough distribution manifold.

The structural shape and assembly of the dough distribution manifold permits expedient opening of the manifold housing to expose the inside surfaces of the dough distribution chamber to permit inspection, maintenance and cleaning of the distribution chamber and of the dough entrance and dough delivery openings. The perimeter wall that forms the distribution chamber is independently supported with respect to the bottom wall and the top wall. The bottom wall and top wall are removable from the perimeter wall. This provides access from both above and below the distribution chamber, allowing easy inspection and cleaning access to the distribution chamber.

Other features and advantages of the present invention will become apparent upon reading the following specification, when taken in conjunction with the accompanying drawings.

DETAILED DESCRIPTION

Figure 1:
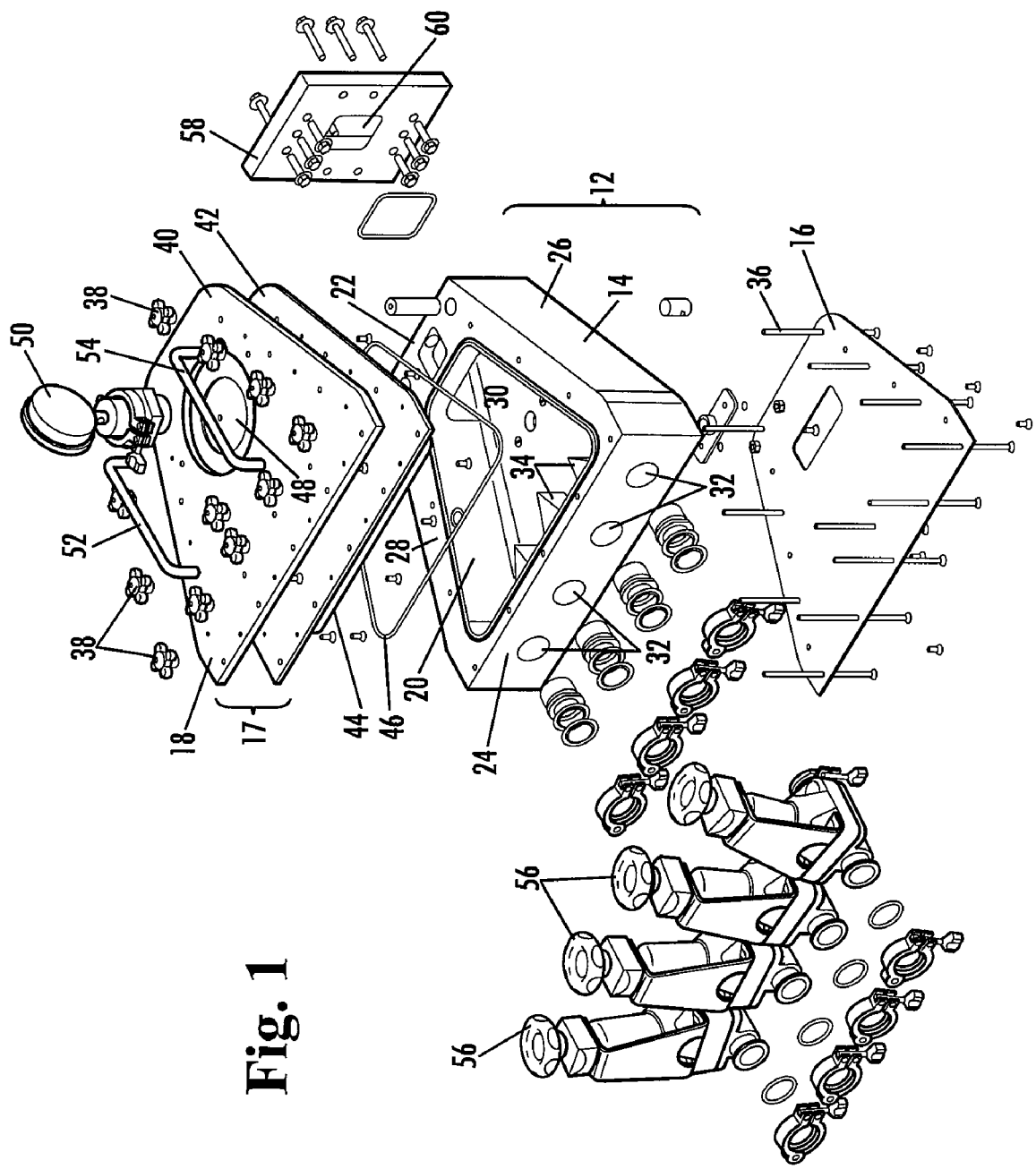
FIG. 1 is an expanded perspective view of the Dough Distribution Manifold.
Figure 2:
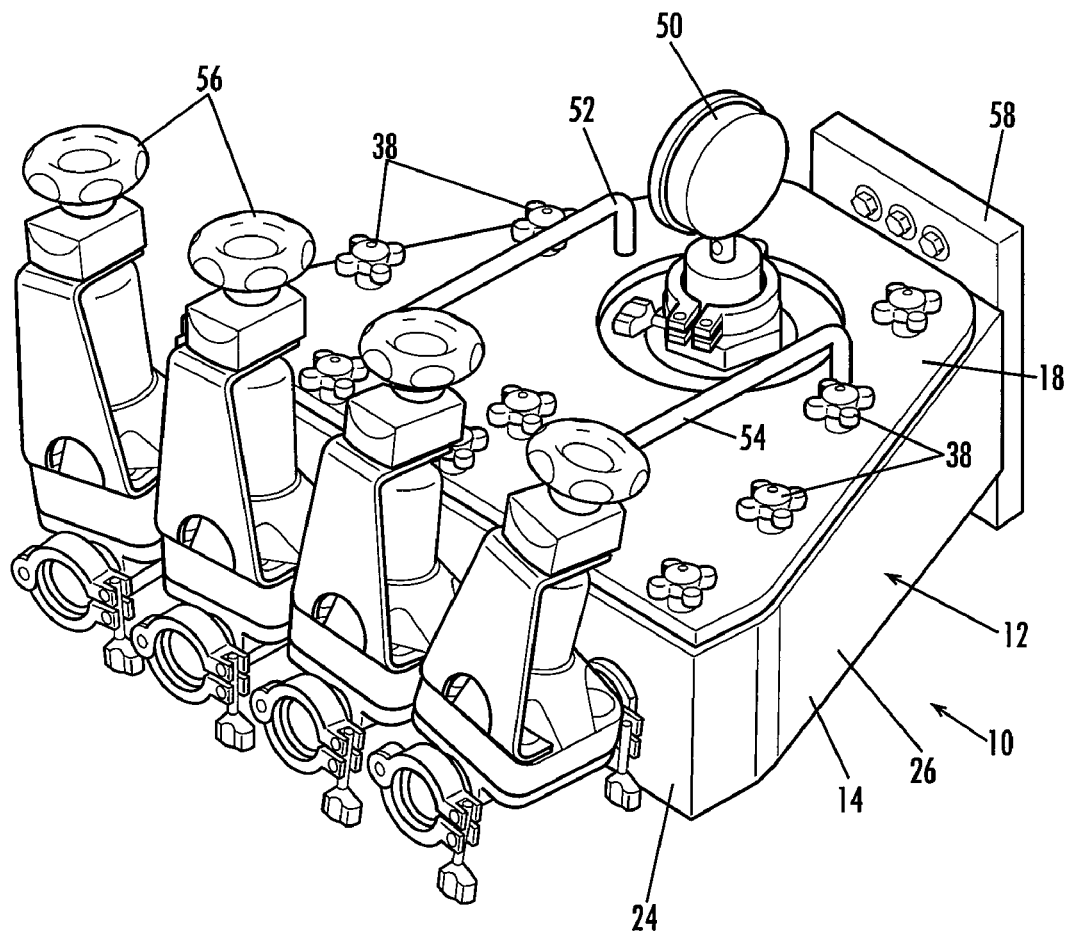
FIG. 2 is an assembled perspective view of the Dough Distribution Manifold.

Referring now in more detail to the drawings, in which like numerals indicate like parts throughout the views, FIG. 2 shows the assembled dough distribution manifold 10 that includes a housing 12 for receiving and dividing dough that passes therethrough. As shown in FIG. 1, the housing 12 includes a perimeter wall 14, a removable bottom wall 16, and a removable top wall assembly 17. The perimeter wall forms a dough distribution chamber 20 and the bottom and top walls close the chamber.

The perimeter wall includes an entrance wall segment 22 positioned on one side of the dough distribution chamber 20 and an exit wall segment 24 positioned on the other side. Diverging sidewall segments 26 and 28 extend from the entrance wall 22 outwardly toward the exit wall segment 24. This forms the housing 12 in a wedge shape.

The entrance wall segment 22 defines a dough entrance opening 30 for passing an incoming dough stream from a dough pump, developer and other up stream equipment into the dough distribution chamber 20. The exit wall segment 24 defines a plurality of dough delivery openings 32 for delivering a plurality of dough streams in parallel from the distribution chamber to a cut off device, etc.

As shown in FIG. 1, wedge-shaped dough dividers 34 may be mounted to the exit wall segment 24 with each dough divider being positioned between adjacent ones of the dough delivery openings 32, and with each having an edge facing the dough entrance opening 30 of the housing 12. These wedge-shaped dough dividers separate the oncoming dough into streams that are directed by the surfaces of the dough divider toward the plurality of dough delivery openings 32, so that the dough flows smoothly from the dough entrance opening 30 to the plurality of dough delivery openings 32.

Figure 3:
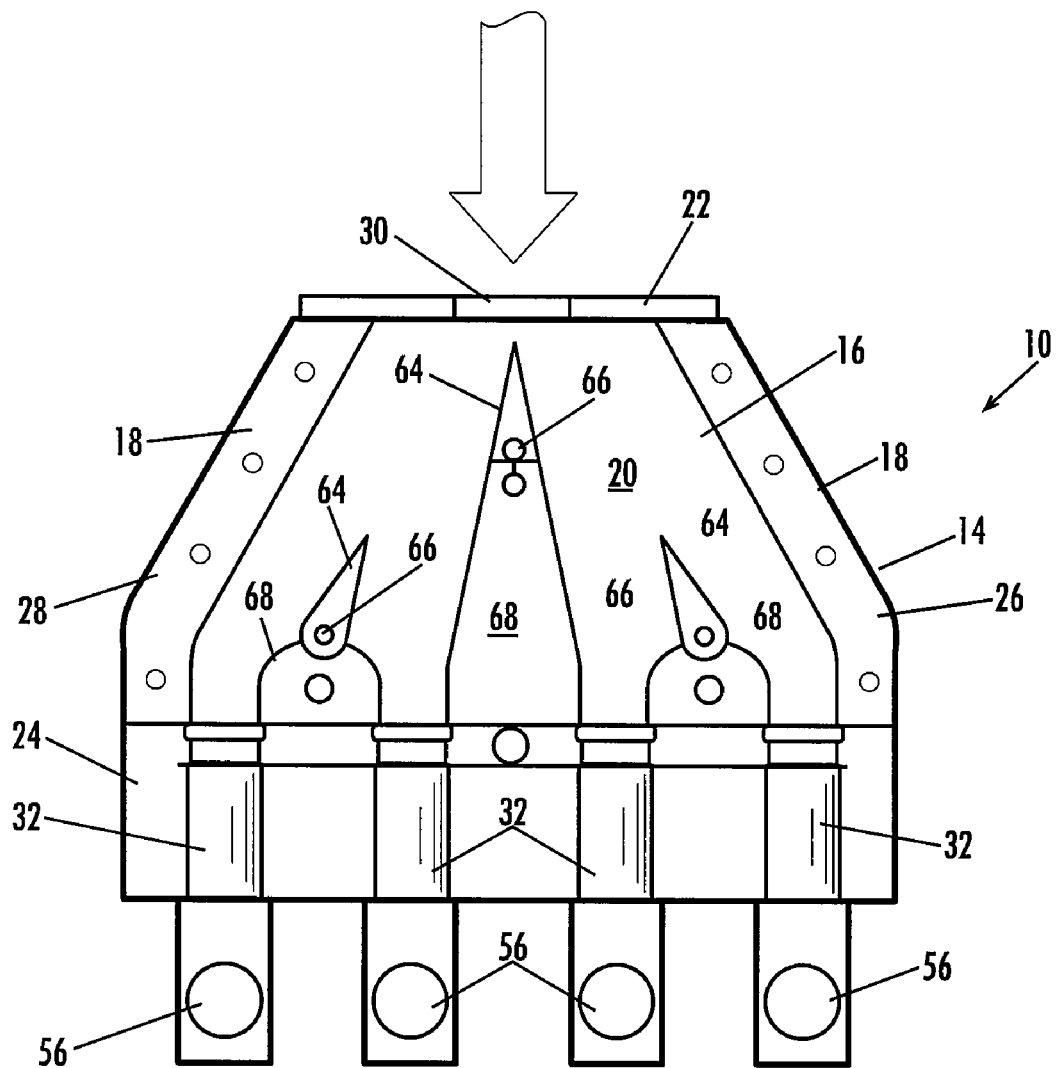
FIG. 3 is a plan view of the Doug Distribution Manifold with its top wall assembly removed to show the variable position dividers.

The dough dividers 34 of FIG. 1 may be stationary. However, FIG. 3 shows adjustable dough dividers 64 that may be pivoted from side to side as desirable to move the leading edges to one side or the other and distribute more or less dough to the adjacent dough delivery openings. There may be an external control (not shown) connected to the adjustable dough dividers through the top wall assembly, or the adjustable dough dividers may be secured by bolts 66 in front of the down stream guides 68. Adjustable dough dividers are disclosed in U.S. Pat. No. 5,356,652, which is incorporated herein in its entirety by reference.

As shown in FIG. 1, the perimeter wall 14 may be independently supported with respect to the bottom wall 16 and top wall 18. The means for supporting the perimeter wall may be the connection of the perimeter wall to the up stream apparatus, such as by the mounting plate 58 at the upstream end of the dough distribution manifold that is connected to a dough developer, and to the dough flow control valves 56 and the down stream apparatus, such as a dough cut off device, or may be connected by its own support from a floor surface, etc.

The removable bottom wall 16 and removable top wall 18 are connected to the perimeter wall 14 by means of elongated bolts 36 that extend upwardly through the bottom wall 16, through the perimeter wall 14, and then through the removable top wall 18. The elongated bolts 36 are engaged by enlarged hand operated nuts 38 that are sized and configured for expedient removal by hand. This makes the removal of both the top wall and the bottom wall expedient and accurate, and also assures firm connection of the top wall and bottom wall to the rest of the housing when replaced. Other types of quick release devices my be used.

It is possible to remove only one of the top wall or the bottom wall by having connectors, such as nuts 38, at both ends of the bolts that hold the top wall and bottom wall to the perimeter wall.

As shown in FIG. 1, removable top wall 18 includes a cover plate 40 that is shaped with a configuration that matches the edges of the perimeter wall 14, and an insert plate 42 that is in sandwiched relationship between the cover plate 40 and the perimeter wall 14. The insert plate has a downwardly extending central protrusion 44 that projects inside the perimeter wall 14. The breadth of the downwardly extending protrusion 44 matches the space between the inside wall surfaces of the perimeter wall 14. The insert plate may be formed with various sized downwardly extending protrusions that extend shallower or deeper into the dough distribution chamber 20, thereby adjusting the volume of the dough distribution chamber. A seal 46 extends about the upper surface of the perimeter wall 14 for engagement with the insert plate 42, thereby assuring a positive seal between these facing surfaces.

As shown in FIG. 1, the removable top wall 18 includes an opening 48 to which a pressure gauge 50 may be mounted. The pressure gauge is of conventional design and is used to measure the pressure of the dough inside the dough distribution chamber 20. Handles 52 and 54 are inverted U-shaped and are attached to the upper surface of removable top wall 18. The handles are positioned on opposite sides of the opening 48 and its pressure gauge 50 so as to enable an operator to easily and safely lift the removable top wall 18 away from the rest of the housing 12.

Valves 56 such as pinch valves or diaphragm valves are mounted to the perimeter wall 14 in communication with the plurality of dough delivery openings 32. The valves are manually adjusted so as to adjust the rate of movement of dough from each of the plurality of dough delivery openings 32 as the system is in operation.

Mounting plate 58 is connected to the entrance wall segment 22 and defines an opening 60 therein. The mounting plate connects the dough entrance opening 30 to the preceding developer, dough pump, mixer, etc.

When the dough distribution manifold 10 is placed in use, it is assembled as shown in FIG. 2. The oncoming stream of dough passes through the dough entrance opening 30 of the entrance wall segment 22 of the perimeter wall 14, entering the dough distribution chamber 20. The dough fills the dough distribution chamber 20 and begins to seek the plurality of dough delivery openings 32.

As the dough migrates toward the exit wall segment 24 of the perimeter wall 14, the facing edges of the dough dividers 34 begin to divide the dough into separate streams. Each separate stream of the oncoming dough is urged between the dough dividers 34 and through the plurality of dough delivery openings 32, and then moves in parallel on to the subsequent components of the system, such as the cut-off where the dough streams are cut into smaller pieces.

After a run of dough has been completed, the dough distribution manifold may be opened for inspection, cleaning, maintenance, etc. The operator unscrews the enlarged hand operated nuts 38 so that the removable top wall 18 and its pressure gauge 50 can be lifted away from the perimeter wall 14. The insert plate 42 and the pressure gauge 50 will be moved with the cover plate 40 away from the perimeter wall 14 so that these elements may be inspected, maintained and cleaned separately from the lower elements of the housing 12. Also, the bottom wall will be released upon removing the hand-operated nuts so it may be removed from the perimeter wall. This provides access from both the top and bottom of the perimeter wall, and independent access to the top and bottom walls.

While the top and bottom walls are removed from the housing, the maintenance personnel will inspect and clean the interior surfaces of the housing, such as the inwardly facing surfaces of the entrance wall segment 22, exit wall segment 24, and the diverging side wall segments 26 and 28. Also, the wedge-shaped dough dividers 34 will be cleaned and inspected. All of these elements are readily exposed and available by the expedient opening of the housing as described above.

After cleaning of the dough distribution manifold, the bottom wall 16 and top wall 18 are replaced. The operator grasps the handles 52 and 54 and lifts the top wall back over the perimeter wall 14 and aligns the bolt openings of the top wall with the bolt holes of the perimeter wall. The bottom wall is placed in alignment with the same bolt holes. Bolts 36 are moved through the aligned openings and the enlarged hand-operated nuts 38 are expediently and manually screwed back on the bolts 36 to firmly attach and seal the bottom wall 16 and top wall 18 to the perimeter wall 14. This same action assures that the bottom wall 16 will be lifted up into sealed relationship with respect to the bottom facing surfaces of the perimeter wall 14.

The perimeter wall has been described as a continuous wall, but other wall structures may be used for the same purpose, such as a perimeter wall constructed of several parts. Also, other types of manual quick release connections may be used to hold the top wall and bottom wall to the rest of the housing, as may be desirable.

Although preferred embodiments of the invention have been disclosed in detail herein, it will be obvious to those skilled in the art that variations and modifications of the disclosed embodiments may be made without departing from the spirit and scope of the invention as set forth in the following claims.

The invention claimed is:

1. A dough distribution manifold for dividing an on-coming dough stream into divided dough streams, comprising:
   a housing including a bottom wall, a perimeter wall forming a dough distribution chamber with said bottom wall, and a removable top wall positioned on said perimeter wall for closing said dough distribution chamber,
   said perimeter wall including an entrance wall segment positioned on one side of the dough distribution chamber, an exit wall segment opposed to said entrance wall on the other side of said dough distribution chamber,
   said entrance wall segment defining the entirety of a dough entrance opening for passing an incoming dough stream into said dough distribution chamber,
   said exit wall segment defining the entirety of a plurality of dough delivery openings for delivering a plurality of dough streams from said distribution chamber,
   a dough divider positioned between adjacent ones of said dough delivery openings arranged for separating the dough passed through the dough distribution chamber into separate dough streams that enter the dough delivery openings, and
   a valve for each of said delivery openings configured for adjusting the rate of flow of dough through each delivery opening.

2. The dough distribution manifold of claim 1, wherein said exit wall segment is longer than said entrance wall segment, and said perimeter wall defining opposed side wall segments joined to said entrance wall segment and to said exit wall segments and diverging toward said exit wall segment.

3. The dough distribution manifold of claim 1, wherein said removable top wall is bolted to said perimeter wall, said removable top wall includes a cover plate in sealed relationship with said perimeter wall and an insert plate extending from said cover plate into said dough distribution chamber with an edge portion matching the shape of the perimeter wall.

4. The dough distribution manifold of claim 3 and further including hand operated knobs releasably connecting said cover plate to said perimeter wall.

5. The dough distribution manifold of claim 3 and further including a pressure gauge releasably mounted to said cover plate in communication through said cover plate with said dough distribution chamber for detecting the pressure of dough passing through said dough distribution chamber.

6. The dough distribution manifold of claim 5 and further including a pair of handles mounted to said cover plate and straddling said pressure gauge for lifting said top wall and said pressure gauge from said perimeter wall.

7. The dough distribution manifold of claim 1 wherein said bottom wall and said top wall engage said dough dividers and prevent dough from entering between said dough dividers and said bottom and said top walls.

8. The dough distribution manifold of claim 1 wherein said dough dividers are wedge shaped with an edge facing said entrance wall segment and are adjustable to vary the proportion of dough directed to adjacent ones of the delivery openings.

9. The dough distribution manifold of claim 1 wherein the surfaces of the perimeter wall and bottom wall and said dough dividers that are to be contacted by dough are exposed when the top wall is removed from said perimeter wall for cleaning the dough distribution manifold.

10. A dough distribution manifold for dividing an on-coming dough stream into divided dough streams, comprising:
- a housing including a perimeter wall forming the perimeter of a dough distribution chamber,
- a bottom wall removably mounted to said perimeter wall and closing the bottom of said dough distribution chamber,
- a top wall removably mounted to said perimeter wall and closing the top of said dough distribution chamber,
- a dough entrance opening and a plurality of dough delivery openings formed in said perimeter wall,
- a dough divider positioned between adjacent ones of said dough delivery openings arranged for separating the dough passed through the dough distribution chamber into separate dough streams that enter the dough delivery openings,
- support means connected to said perimeter wall for supporting said perimeter wall independently of said bottom and top walls, and
- releasable connectors connecting said bottom wall and said top wall from said perimeter wall for removing said bottom wall and said top wall from said perimeter wall and exposing the distribution chamber from both above and below the dough distribution chamber.

11. The dough distribution manifold of claim 10 wherein said top wall includes a cover plate for covering the dough distribution chamber and an insert plate extending from said cover plate into said dough distribution chamber for adjusting the volume of the dough distribution chamber and including an edge portion matching the shape of the perimeter wall.

12. The dough distribution manifold of claim 10 wherein said releasable connectors comprise hand operated knobs releasably connecting said top wall to said perimeter wall.

13. The dough distribution manifold of claim 11 and further including a pressure gauge releasably mounted to said cover plate in communication through said cover plate with said dough distribution chamber for detecting the pressure of dough passing through said dough distribution chamber.

14. The dough distribution manifold of claim 13 and further including a pair of handles mounted to said cover plate and straddling said pressure gauge for lifting said top wall and said pressure gauge from said perimeter wall.

15. A dough distribution manifold for dividing an on-coming dough stream into divided dough streams, comprising:
- a housing including a perimeter wall forming a dough distribution chamber,
- a dough entrance opening and a plurality of dough delivery openings formed in said perimeter wall,
- a top wall removably positioned on said perimeter wall for closing said dough distribution chamber, a bottom wall removably mounted to said perimeter wall and closing the bottom of said dough distribution chamber,
- a dough divider positioned between adjacent ones of said dough delivery openings arranged for separating the dough passed through the dough distribution chamber into separate dough streams that enter the dough delivery openings,
- support means connected to said perimeter wall for supporting said perimeter wall independently of said top wall, and
- hand operated connectors connecting said removable top wall from said perimeter wall for exposing the distribution chamber.

16. The dough distribution manifold of claim 15 and further including
- connectors for releasably connecting said bottom wall and said top wall together through said perimeter wall,
- such that the bottom wall and top wall are removable from said perimeter wall for cleaning said distribution chamber.

17. The dough distribution manifold of claim 15 and further including a pressure gauge releasably mounted to said top wall in communication through said top wall with said dough distribution chamber for detecting the pressure of dough passing through said dough distribution chamber, and a pair of handles mounted to said top wall and straddling said pressure gauge for lifting said top wall and said pressure gauge from said perimeter wall.

\* \* \* \* \*